United States Patent [19]

Christophe et al.

[11] Patent Number: 4,587,017
[45] Date of Patent: May 6, 1986

[54] FILTER INCORPORATING MULTIPLE CHAMBERS FOR RECEIVING THE FILTERED FLUID AND ANOTHER FLUID ISSUING FROM THE RESIDUE OF THE MAIN FILTRATION

[75] Inventors: Théophile Christophe, Fontenay le Fleury; Jean-Claude Moatti, Boulogne, both of France

[73] Assignee: Georges Moatti, France

[21] Appl. No.: 669,308

[22] Filed: Nov. 7, 1984

[30] Foreign Application Priority Data

Nov. 17, 1983 [FR] France .................. 83 18327

[51] Int. Cl.⁴ .................. B01D 25/02; B01D 25/32
[52] U.S. Cl. .................. 210/323.1; 210/333.01; 210/345; 210/347; 210/444
[58] Field of Search ............ 210/323.1, 333.01, 333.1, 210/345–347, 411, 413, 414, 440, 443, 444, 472

[56] References Cited

U.S. PATENT DOCUMENTS

| | | | |
|---|---|---|---|
| 2,743,018 | 4/1956 | Belgarde | 210/440 X |
| 2,748,949 | 6/1956 | James | 210/440 X |
| 2,868,383 | 1/1959 | Nicolls | 210/323.1 |
| 3,561,602 | 2/1971 | Molitor | 210/335 X |
| 3,944,488 | 3/1976 | Moatti | 210/345 X |
| 3,975,273 | 8/1976 | Shaltz et al. | 210/440 X |
| 3,994,810 | 11/1976 | Schaeffer | 210/333.1 X |
| 4,481,111 | 11/1984 | Christophe et al. | 210/333.01 |
| 4,517,082 | 5/1985 | Prudhomme | 210/440 X |

FOREIGN PATENT DOCUMENTS

| | | |
|---|---|---|
| 0022021 | 1/1981 | European Pat. Off. . |
| 0108665 | 5/1984 | European Pat. Off. . |
| 1018845 | 11/1957 | Fed. Rep. of Germany ... 210/323.1 |
| 2534149 | 4/1984 | France . |
| 799990 | 8/1958 | United Kingdom ............. 210/323.1 |

Primary Examiner—Robert Spitzer
Attorney, Agent, or Firm—Poms, Smith, Lande & Rose

[57] ABSTRACT

The invention relates to a filter comprising main and secondary filtering stacks and a distribution valve provided with main and secondary enclosures adapted to isolate the filtering elements of the two stacks section by section with a view to deblinding them, the fluid issuing from deblinding being directed towards a discharge chamber. This chamber communicates with an enclosure without pressure via a duct and a complementary duct provided with a valve. One application of the invention is the production of a filter with high yield of filtration.

7 Claims, 8 Drawing Figures

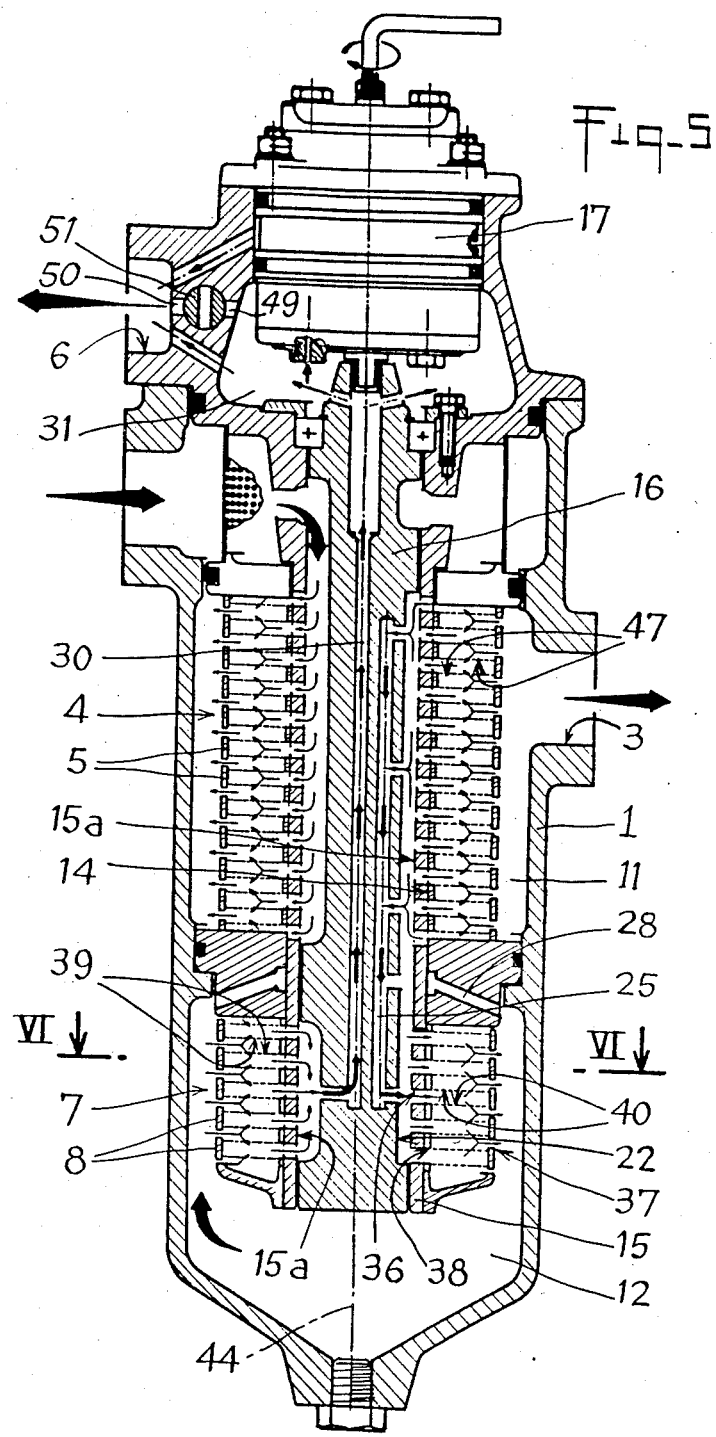

FILTER INCORPORATING MULTIPLE CHAMBERS FOR RECEIVING THE FILTERED FLUID AND ANOTHER FLUID ISSUING FROM THE RESIDUE OF THE MAIN FILTRATION

The present invention relates to a filter incorporating multiple chambers for receiving the filtered fluid and another fluid issuing from the residue of the main filtration.

Filters are already known, constituted by:

a filter body comprising a plurality of distinct chambers isolated from one another, a main stack of filtering elements contained in one of said chambers, called main chamber, each of the filtering elements of the main stack having a recessed centre and a cylindrical side comprising a plurality of sections isolated from one another and being provided on its outer and inner radial circumferences with orifices for communication of each of its sections with said circumferences, a shut-off distribution valve which is adjusted to said cylindrical side, which is mounted to rotate about the axis of the cylindrical side, and which comprises one main enclosure capable, in a first position of the distribution valve, of isolating a first section of any one filtering element of the main stack from the other sections of said filtering element and of communicating with said first section via the orifice for communication of said first section, and a discharge chamber connected, on the one hand, to the main enclosure at least by a duct inside the distribution valve, on the other hand, to a fluid evacuation union with the interposition of a calibrated restriction.

Certain filters are further completed by a secondary stack of filtering elements arranged similarly to the main stack, the distribution valve in that case itself being completed by a secondary enclosure.

The function of this distribution valve is periodically to allow "deblinding" of the screens of one or of both stacks, using at least for deblinding the screens of the filtering elements of the secondary stack, fluid already filtered by the main stack.

It has been observed that, after a certain time, the efficiency of such deblinding decreased. Two solutions are used at present, which consist either in effecting a more powerful super deblinding with a compressed gas (ofter air), or in awaiting the next complete cleaning of the filter.

Super deblinding using compressed air present the drawback of introducing air into the circuit of the filter, which is detrimental and not advised when the fluid to be filtered is a fuel or oil. In addition, the manoeuvre to be effected is relatively long and renders the filter unavailable during execution thereof.

The absence of super deblinding obviously produces nothing and ends in a complete dismantling, which is also long, and expensive in terms of unavailability of the filter.

It is an object of the invention to overcome these drawbacks by proposing a novel arrangement ensuring, very easily and instantaneously, a super deblinding with the same fluid already filtered, but at a pressure greater than that of conventional deblinding.

According to the invention, a complementary duct connects the discharge chamber to an enclosure without pressure, whilst a two-position valve is disposed in this complementary duct, obturates, in its first position, said complementary duct and, in its second position, ensures free communication of the two sections of the complementary duct connected thereto.

The arrangements of the invention are advantageously applied to the filters in which:

the distribution valve is connected to a hydraulic motor for driving in rotation, provided with at least one fluid supply duct which is in communication with the discharge chamber, the filter further comprises a secondary stack of filtering elements contained in another of said chambers, called secondary chamber, each of the filtering elements of the secondary stack having a recessed centre and a cylindrical side comprising a plurality of sections isolated from one another and being provided on its outer and inner radial circumferences with orifices for communication of each of its sections with said circumferences, whilst the distribution valve comprises a secondary enclosure capable, in a second position of the distribution valve possibly merged with the first position, of isolating a first section of any one filtering element of the secondary stack from the other sections of said filtering element and of communicating with said first section via the orifice for communication of said first section, the discharge chamber then being connected to the main enclosure via the secondary chamber and two ducts inside the distribution valve, as well as to the secondary enclosure likewise via the secondary chamber, the enclosure without pressure is constituted by the evacuation union itself.

The advantage of this novel layout is, by effectively producing a super deblinding, that of avoiding the mixture of a liquid fluid to be filtered, such as oil or fuel, with a compressed gas. In this way, the drawbacks of oxidation and/or of formation of gas bubbles within the liquid having to be filtered are in particular avoided.

The invention will be more readily understood on reading the following description with reference to the accompanying drawings, in which:

FIG. 5 is an axial section of the same filter as that of FIG. 1, but in a second configuration of operation;

FIG. 8 is a partial axial view, similar to that of FIGS. 1 and 5, of the filter in a third configuration of operation.

Figure 1:
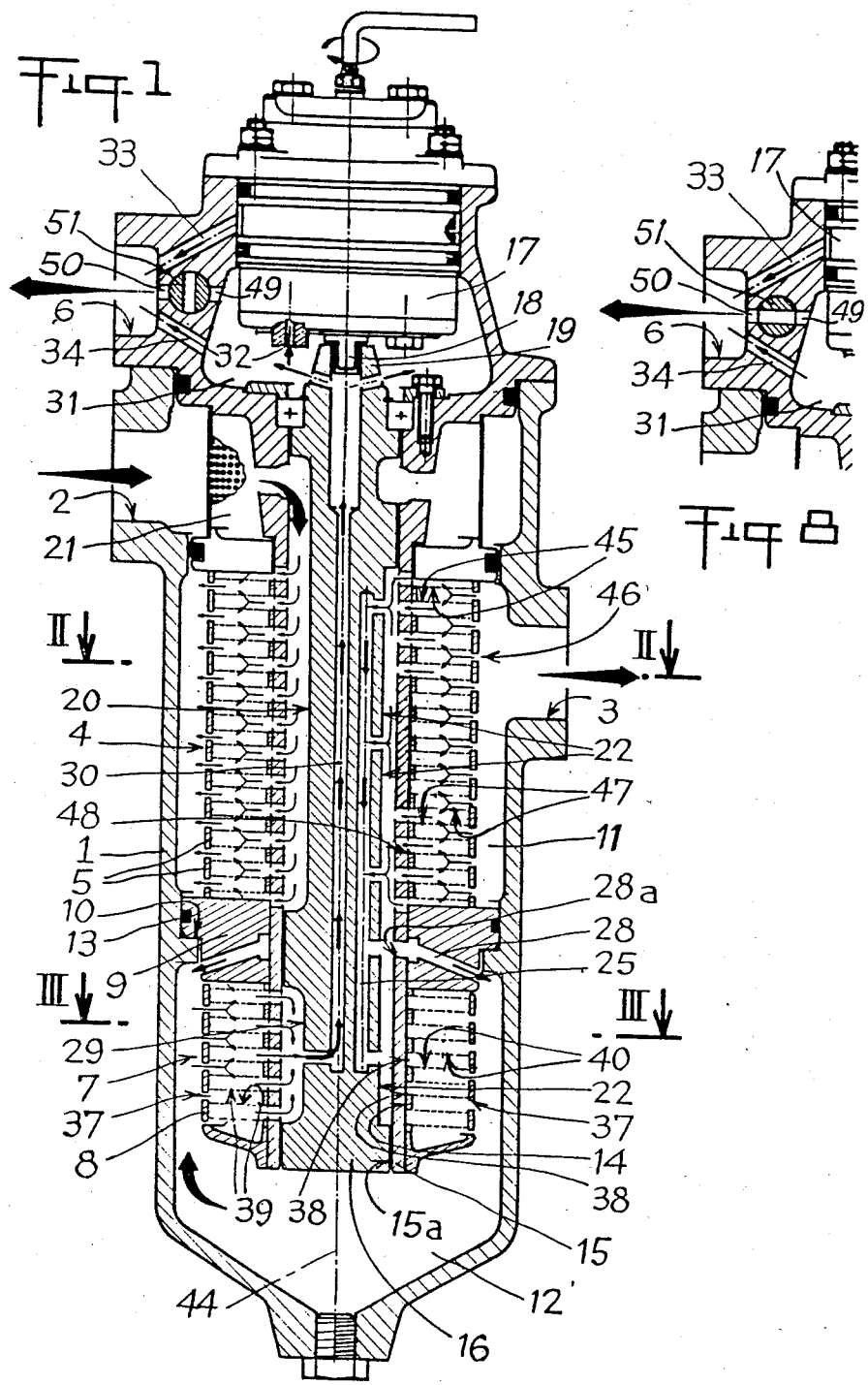
FIG. 1 is an axial section of a filter according to the invention, in a first configuration of operation.

Referring now to the drawings, the filter of FIGS. 1 to 4 comprises:

a filter body 1, provided with an admission union 2 for the fluid having to be filtered, an evacuation union 3 for the fluid filtered by a main stack 4 of filtering elements 5, and with an evacuation union 6 for the deblinding fluid of the filtering elements 5, after filtration of this deblinding fluid by a secondary stack 7 of filtering elements 8, said main and secondary stacks 4 and 7 respectively, separated by an intermediate piece 9, which bears on a shoulder 10, with which the body 1 is provided, and which forms inside said body two main and secondary chambers 11 and 12 respectively, separated with seal (13), the main chamber 11 communicating with the evacuation union 3, a bore 14, common to the two stacks 4 and 7, to which is fitted an inside ring 15, inside which a distribution valve 16 is mounted in a bore 15a, rotatable about an axis 44, a hydraulic motor 17, for step-by-step drive of the distribution valve 16, mounted on the body 1 and coupled by a drive head 18 to one end 19 of the distribution valve 16, a peripheral groove 20, made in the distribution valve 16, which is in communication with the admission chamber 21 for the fluid having to be filtered, itself being in communication with the admission union 2, a groove 22, which is formed in the distribution valve 16 and makes it possible to isolate one angular section 23 of certain only, or of all the filtering elements 5 of the main stack 4 from the other angular sections 24 of the same filtering elements 5, the groove 22 formed in the distribution valve 16 is capable of communicating, on the one hand (FIGS. 1 and 3), via a duct 25 inside the distribution valve, with the orifice 28a by which one of the ducts 28, made in the intermediate piece 9, opens into the bore 15a of the ring 15, on the other hand (FIGS. 5 and 6), with only one angular section 27 of each filtering element 8 of the secondary stack 7, a peripheral groove 29, made in the distribution valve 16, which communicates, by a duct 30 inside the valve 16, with an upper chamber 31 made in the body 1, supply ducts 32 for the motor 17, communicating with the upper chamber 31, the exhaust duct 33 of the motor 17 communicating with the evacuation union 6, a calibrated connecting duct 34 (having a given pressure drop) connecting the upper chamber 31 to the evacuation union 6, a complementary duct with two sections 49, 50 also connecting the upper chamber 31 to the evacuation union 6, a valve 51, or two-way tap, to which are connected the two sections 49 and 50 of the complementary conduit.

The following arrangements should be noted:

the groove 22 is capable of communicating, via holes 35a, 35b, 35c made in the ring 15 in the zone of the main stack 4, with a section 23 of the corresponding filtering elements 5;

this same groove 22 is capable of communicating, via holes 36 made in the ring 15 in the zone of the secondary stack 7, with a section 27 of the corresponding filtering elements 8;

the duct 25 inside the distribution valve 16, which communicates with the groove 22, opens out only into the secondary chamber 12;

the duct 28, made in the intermediate piece 9, opens out, in addition, into the secondary chamber 12;

orifices 37 in the filtering elements 8 of the secondary stack 7 are disposed on the outer circumference of this stack and are separated from orifices 38 of the same filtering elements disposed on the inner circumference and communicating with the holes 36 of the ring 15, by the filtering screens;

these filtering screens each have a side 39 which communicates with the secondary chamber 12 via the orifices 37, and a side 40 which communicates with the central bore 14 via the orifices 38;

the holes in the ring 15 disposed in the zone of the main stack 4 are divided, for each column of superposed sections 23 or 24 of the filtering elements 5, into three distinct groups of orifices 35a, 35b, 35c;

the orifices of each group being aligned on a straight line 41a, 41b, 41c, respectively, parallel to a generatrix of the cylindrical surface of the bore 15a of the ring 15; these various straight lines 41a, 41b, 41c, further being slightly offset with respect to one another so that the groove 22 communicates permanently only with an overall section of the holes 35a and/or 35b and/or 35c which is substantially constant and equal to the overall section of the holes 35a, or of holes 35b, or of holes 35c, and not of all the holes 35a, 35b and 35c;

the groove 22 is itself parallel to a generatrix of the cylindrical surface of the bore 15a of the ring 15;

the holes 36 in the ring 15, which correspond to the orifices 38 of the superposed sections of the same column of sections of filtering elements 8, are aligned on a straight line 42, parallel to a generatrix of the cylindrical surface of the bore 15a of the ring 15;

depending on the relative position of the distribution valve 16 with respect to the ring 15, in the example shown, either the groove 22 is isolated from holes 36 (FIGS. 1, 3 and 4) and in that case communicates with one of the orifices 28a, or the groove 22 communicates with the holes 36 of one of the rows of holes 36 (FIGS. 5, 6 and 7) and is in that case isolated from orifices 28a;

the filtering screens of the filtering elements 5 of the main stack 4 each have a side 45 which communicates with the main chamber 11 via orifice 46, and a side 47 which communicates with the holes 35a, 35b or 35c in the ring 15 via orifices 48;

the axis of duct 30 merges with the axis of rotation 44;

in the configurations of FIGS. 1 and 5, the valve 51 obturates duct 49-50, whilst in the configuration of FIG. 8, this valve 51 establishes free communication of the section 49 with section 50;

the evacuation union 6 returns the fluid which passes therethrough towards a reservoir of fluid without pressure (or at very low pressure).

The fluid having to be filtered, admitted into the admission chamber 21, arrives in the groove 20 of the distribution valve, passes through the orifices of the inner circumference of the sections 24 of the filtering elements 5 which are opposite the groove 20, then through the corresponding holes 35a and/or 35b and/or 35c in the ring 15, passes through the screens, then the orifices in the outer circumference of the same sections, and emerges filtered in the main chamber 11 in order thereafter to be evacuated through the evacuation union 3.

Figure 2:
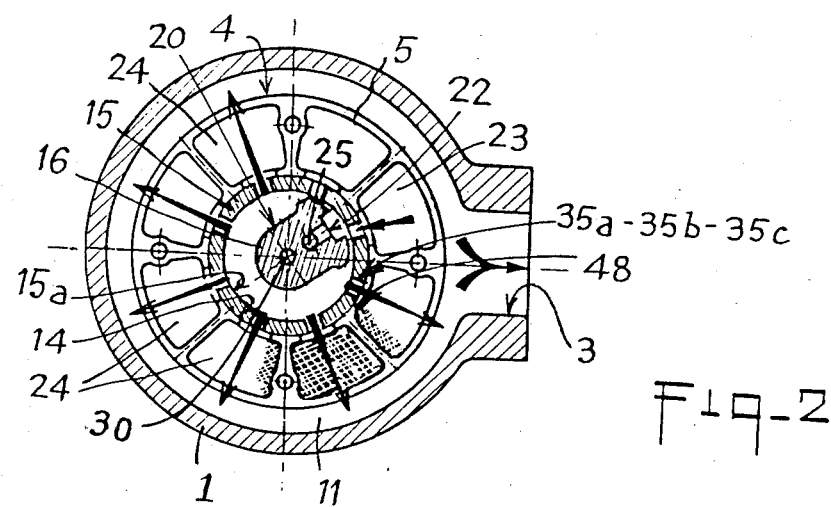
FIGS. 2 and 3 are sections along II—II and III—III respectively, of FIG. 1.

However, part of the filtered fluid contained in the main chamber 11 passes, in the direction opposite the preceding one, from the outer circumference towards the inner circumference of the stack 4, through those sections 23 of the filtering elements 5 which are disposed opposite the groove 22 (FIG. 2). This small part of the filtered fluid makes it possible to clear the screens of said sections 23 of the impurities which were previously deposited thereon and, by cleaning these screens, thus render them capable again of efficient filtration. This part of the fluid, which passes through the screens of sections 23 is collected by the groove 22 and conveyed, laden with the impurities detached from the screens of sections 23 of the filtering elements 5 opposite the part of the ring 15 corresponding to the orifices 28a and to holes 36.

Figure 3:
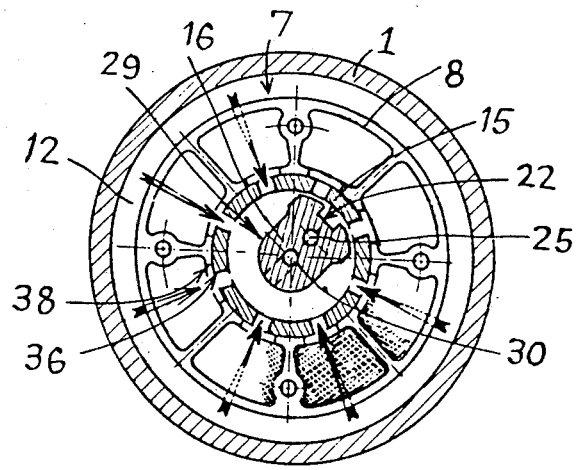
Figure 4:
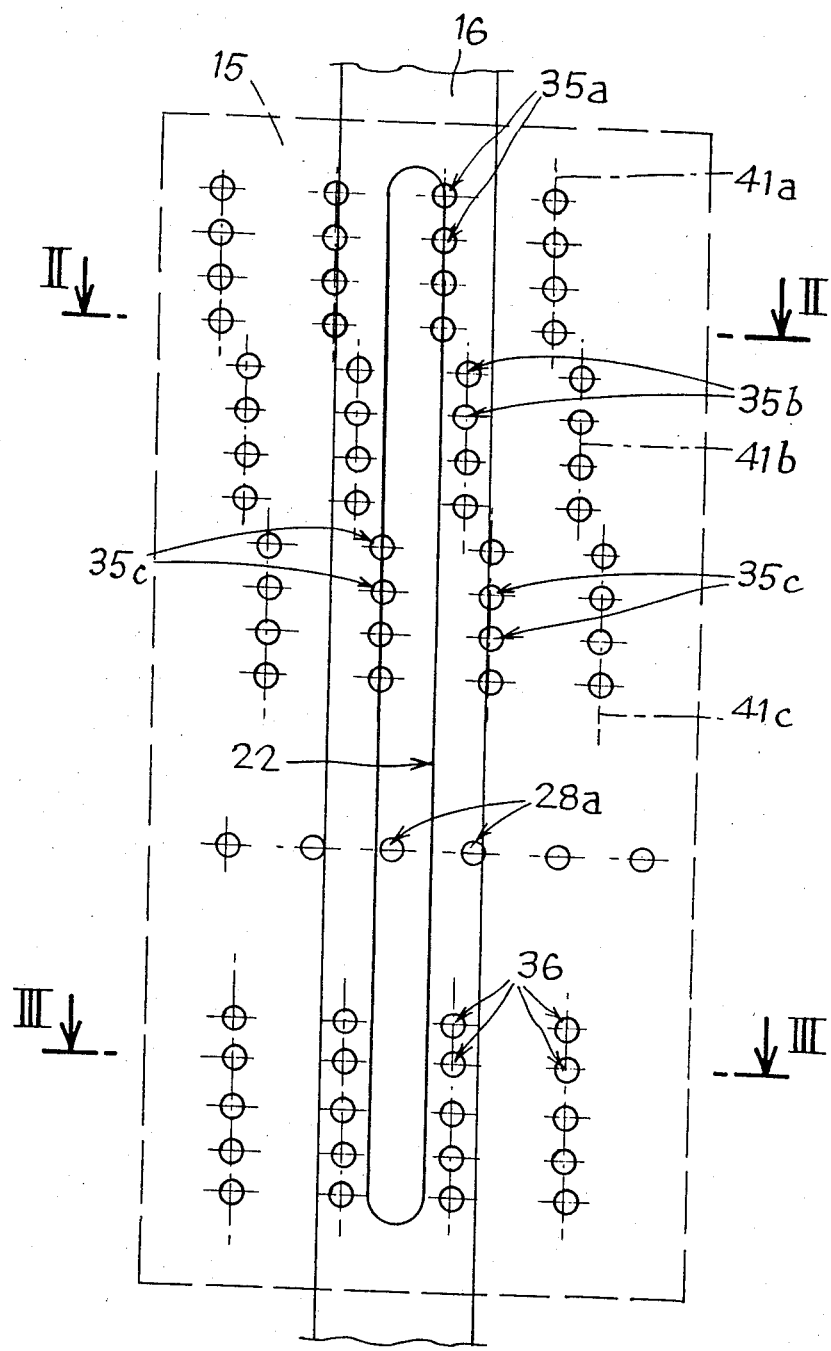
FIG. 4 is a developed view of the cylindrical side of the distribution valve of the filter of FIG. 1 and of the side opposite the stacks of filtering elements.

In the configuration of FIGS. 1, 3 and 4, this fluid laden with impurities is poured into the secondary chamber 12. From this chamber, the fluid crosses, from the outer circumference towards the inner circumference of the sections of the filtering elements of the secondary stack 7, which are opposite the groove 29 of the distribution valve 16, and, filtered by the screen of said sections, from the groove 29 is directed by duct 30, chamber 31 and duct 34 towards the evacuation union 6 for further use.

Figure 6:
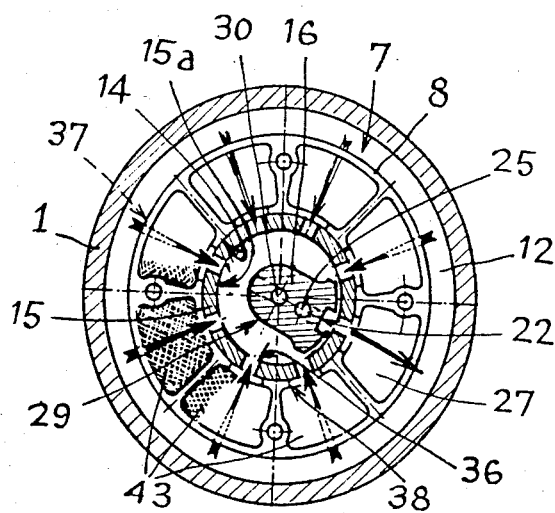
FIG. 6 is a section along VI—VI of FIG. 5.
Figure 7:
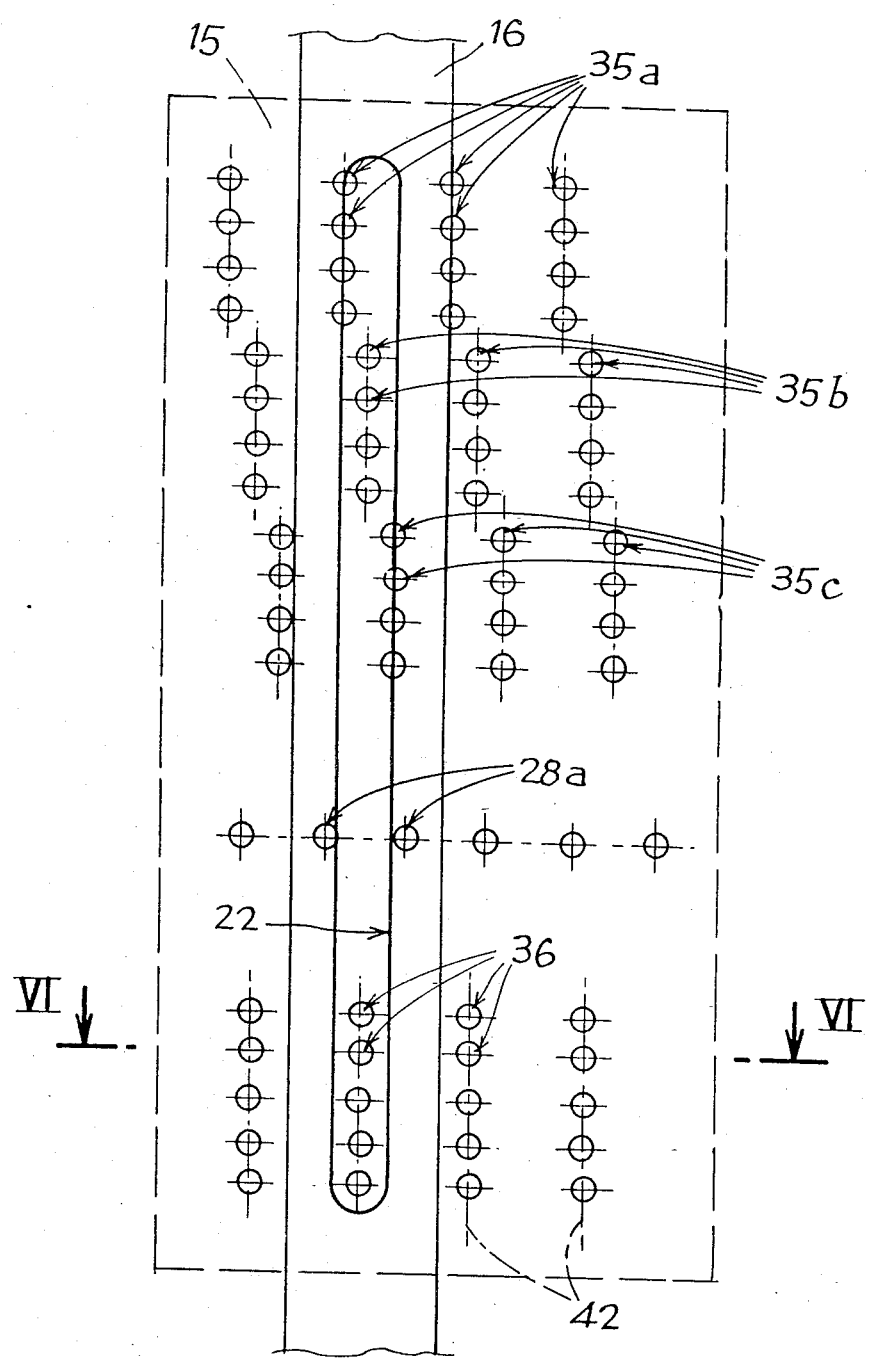
FIG. 7 is a developed view similar to that of FIG. 4, but corresponding to the configuration of FIG. 5.

In the configuration of FIGS. 5, 6 and 7, the fluid laden with impurities, contained in the groove 22, passes through holes 36 and orifices 38, deposits its impurities on the sides 40 of the screens of sections 27 of the filtering elements 8 and, passing through the orifices 37, arrives in chamber 12. By the circuit already defined hereinbefore, the fluid of chamber 12 is filtered, then conveyed up to the evacuation union 6.

Both in the configuration of FIG. 1 and in that of FIG. 5, the valve 51 obturating the complementary duct 49-50 on the one hand, and the calibration of the duct 34 creating a loss of pressure between the upper chamber 31 and the evacuation union 6 on the other hand, the fluid contained in the upper chamber 31 has a pressure greater than that of the fluid contained in the union 6. This pressure of the fluid contained in the upper chamber 31 is in particular sufficient for this fluid to drive the motor 17 in rotation.

In addition, the pressure in the upper chamber 31 constitutes an obstacle to the flow of the deblinding fluid from the main chamber towards the groove 22, through the filtering elements 5 of the main stack 4, and from the groove 22 towards the secondary chamber 12 through the filtering elements 8 of the secondary stack 7. This obstacle, which is only partial, provokes a limitation of the rate of flow of the fluid necessary for deblinding, such limitation being necessary as, in its absence, the whole of the filtered fluid contained in the main chamber 11 would be used for deblinding the screens, with the result that no fraction of this fluid would be usable for any circuit other than the filter itself.

When, at regular intervals of time, it appears judicious to deblind the screens more powerfully than during usual operation (according to the configurations of FIGS. 1 and 5), the user places the valve 51 in the configuration of FIG. 8, which corresponds to the non-obturation of the complementary duct 49-50. In this new configuration, the pressure drop between the upper chamber 31 and the evacuation union 6 is lower than the value that it had in the configurations of FIGS. 1 and 5. Similarly, the pressure in the upper chamber 31 is also less than its earlier value, with the result that the flow of the deblinding fluid is facilitated. The more powerful deblinding which is sought after, or "super deblinding", is thus effected, simply by manoeuvring the valve 51 and with the same fluid as that cleansed by the filter.

By way of indication, it may be noted that if, in usual operation (FIGS. 1 and 5), the flow of fluid used for deblinding is equal to about 5% (five percent) of the flow filtered by the main stack 4, during "super deblinding", this flow may be equal to 20% of the flow filtered by the main stack 4, or four times greater than the normal value. These figures relative to real filters make it possible to understand the efficiency of this phase of "super deblinding" during which the screens are entirely freed of the impurities which were previously deposited thereon.

Finally, it should be noted that the positioning of the valve 51 in the "super deblinding" configuration (FIG. 8), instead of being controlled by the user, may, in a variant embodiment, be effected automatically by the adoption of a detector detecting the clogging of the screens of the filtering stacks, or of a counter metering the time of use.

The invention is not limited to the embodiment shown, but covers, on the contrary, all the variants which may be made thereto without departing from its scope or its spirit.

What is claimed is:

1. In a filter constituted by:
   a filter body comprising a plurality of distinct chambers isolated from one another,
   a main stack of filtering elements contained in one of said chambers, called main chamber, each of the filtering elements of the main stack having a recessed centre and a cylindrical side, comprising a plurality of sections isolated from one another and being provided on its outer and inner radial circumferences with orifices for communication of each of its sections with said circumferences,
   a shut-off distribution valve which is adjusted to said cylindrical side, which is mounted to rotate about the axis of the cylindrical side, and which comprises a main enclosure capable in a first position of the distribution valve, of isolating a first section of any one filtering element of the main stack from the other sections of said filtering element and of communicating with said first section via the orifice for communication of said first section,
   a discharge chamber connected to said main enclosure by at least one inlet duct through said distribution valve and connected to a fluid evacuation union through a calibrated outlet restriction, and
   wherein said discharge chamber is connectable to an unpressurized enclosure through a complementary duct by means of a two-position valve such that, in a first position of said valve, said complementary duct is closed against flow, and in a second position of said valve, said complementary duct ensures free communication between said discharge chamber and said unpressurized enclosure.

2. The filter of claim 1,
   wherein said distribution valve is connected to a hydraulic motor for driving said distribution valve in rotation, said motor being provided with at least one fluid supply duct which is in communication with the discharge chamber.

3. The filter of claim 2,
   further comprising a secondary stack of filtering elements contained in another of said chambers, called secondary chamber, each of the filtering elements of the secondary stack having a recessed centre and a cylindrical side comprising a plurality of sections isolated from one another and being provided on its outer and inner radial circumferences with orifices for communication of each of its sections with said circumferences, whilst the distribution valve further comprises a secondary enclosure capable, in a second position of the distribution valve, of isolating a first section of any one filtering element of the secondary stack from the other sections of said filtering element and of communicating with said first section via the orifice for communication of said first section, the discharge chamber then being connected to the main enclosure via the secondary chamber and ducts inside the distribution valve, as well as to the secondary enclosure likewise via the secondary chamber.

4. The filter of claim 2, wherein said unpressurized enclosure is the evacuation union itself.

5. The filter of claim 1, further comprising a secondary stack of filtering elements contained in another of said chambers, called secondary chamber, each of the filtering elements of the secondary stack having a recessed centre and a cylindrical side comprising a plurality of sections isolated from one another and being provided on its outer and inner radial circumferences with orifices for communication of each of its sections with said circumferences, whilst the distribution valve further comprises a secondary enclosure capable, in a second position of the distribution valve, of isolating a first section of any one filtering element of the secondary stack from the other sections of said filtering element and of communicating with said first section via the orifice for communication of said first section, the discharge chamber then being connected to the main enclosure via the secondary chamber and ducts inside the distribution valve, as well as to the secondary enclosure likewise via the secondary chamber.

6. The filter of claim 5, wherein said unpressurized enclosure is the evacuation union itself.

7. The filter of claim 1, wherein said unpressurized enclosure is the evacuation union itself.

* * * * *